April 25, 1961  N. SCHWARTZ  2,981,647
FABRICATION OF ELECTROLYTIC CAPACITOR
Filed Sept. 4, 1958
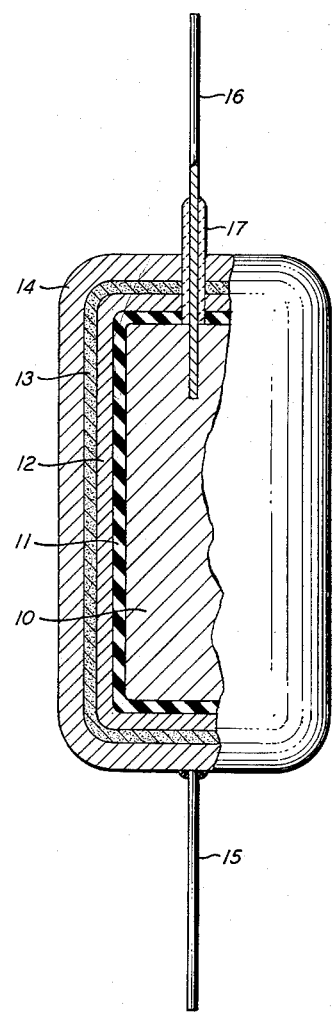
INVENTOR
*N. SCHWARTZ*
BY
*ATTORNEY*

United States Patent Office 2,981,647
Patented Apr. 25, 1961

2,981,647

FABRICATION OF ELECTROLYTIC CAPACITOR

Newton Schwartz, New York, N.Y., assignor to Bell Telephone Laboratories, Incorporated, New York, N.Y., a corporation of New York Filed Sept. 4, 1958, Ser. No. 758,977

2 Claims. (Cl. 148—6.14)

This invention relates to a method for the fabrication of aluminum solid electrolytic capacitors.

Solid electrolytic capacitors of the type described in copending application Serial No. 346,416, filed April 2, 1953, are finding wide commercial acceptance by reason of their excellent electrical characteristics. The solid electrolytic capacitors which are presently being manufactured and sold employ tantalum anodes. However, tantalum has the disadvantages of being costly and in short supply. Accordingly, efforts have been directed to the fabrication of solid electrolytic capacitors employing anodes of aluminum, a relatively inexpensive and readily obtainable film-forming metal.

As described in detail in the above-mentioned copending application, the dielectric of capacitors of the type under consideration is an oxide layer produced by anodizing procedures. The dielectric oxide layer produced by the anodization of a tantalum body is stable and is not seriously disturbed by the thermal shock which is incident to the subsequent pyrolysis steps used to produce the layers of manganese dioxide in situ.

In contrast, the dielectric properties of the oxide layer formed by the anodization of an aluminum body are severely impaired by the practice of the aforementioned pyrolysis steps. In view of this deficiency, it has not been possible to fabricate commercial grade solid electrolytic capacitors utilizing anodes of aluminum.

In accordance with the present invention, there are produced solid electrolytic capacitors utilizing aluminum anodes which possess electrical characteristics at least commensurate with tantalum solid electrolytic capacitors of commercial quality. It has been discovered that the deleterious effects of the pyrolysis procedure may be considerably lessened by annealing the aluminum prior to anodization. A second equally important part of the present invention, also practiced prior to anodization, consists of boiling the aluminum body in water for a prescribed time. Although the reasons underlying the beneficial effects of the annealing and boiling steps are not fully known, the manner in which they act to enhance the properties of the capacitor has been clearly established.

Annealing has been found to have a profound effect on the aging characteristics of a capacitor so treated. As is discussed in detail below, annealing substantially eliminates both the decrease in capacitance and the increase in effective series resistance which otherwise occur upon aging.

Boiling the aluminum anode as described causes a substantial reduction in both the leakage current and effective series resistance of the capacitor, and an increase in the capacitance and over-voltage rating.

This invention will be more fully understood from the following detailed description when taken in conjunction with the accompanying drawing.

The figure is a perspective view, partly in section, of a solid aluminum electrolytic capacitor.

With further reference to the drawing there is depicted a capacitor of the type to which the present invention is directed. The anode 10 is a porous aluminum body fabricated, for example, in accordance with the procedure described in copending application Serial No. 758,429, filed September 2, 1958. In intimate contact with anode 10 is oxide film 11 produced by anodization. Covering oxide film 11 is a film of a manganese dioxide 12 produced in situ by pyrolysis of an aqueous solution of manganous nitrate. Graphite layer 13 and solder shell 14 complete the capacitor. Electrode 15 is attached to shell 14 by soldering. Electrode 16 is an integral part of anode 10, having been inserted during the fabrication of the anode. A layer of quartz cement 17 on electrode 16 is employed to prevent short-circuiting of the capacitor.

For illustrative purposes, the present invention is described below in terms of the fabrication of solid electrolytic capacitors using both a wound wire and a porous body anode. However, it is to be appreciated that the present invention is applicable to the manufacture of solid electrolytic capacitors employing aluminum anodes of any shape or type. The term "solid electrolytic capacitor" as used in this specification is intended to include a capacitor produced in accordance with the process described in the above copending application.

One illustration of the process of this invention is in the construction of a solid electrolytic capacitor employing a wound wire aluminum anode. A high purity aluminum wire, for example, a four inch length of 30 mil diameter, is wound into an open helix. This helix is made by winding the wire about itself to form coils at intervals of approximately 10 mils.

The wound wire is boiled in a hydrocarbon solvent to remove oil or grease which may be present on its surface.

The next step in the process consists of annealing the wound helix to a temperature at least equal to the temperature employed in the pyrolysis step. Subject to this limitation, the annealing is generally conducted at a temperature in the range of from 400° C. to 500° C. The wire is maintained at the annealing temperature for a time in the range of 10 minutes to 45 minutes. It has been determined that 10 minutes is the minimum amount of time required for any noticeable improvement in electrical characteristics of the finished capacitor. Annealing periods of greater than approximately 45 minutes have not been found to produce any substantial improvement.

The wire is next treated to remove any thermal oxide which may be present on the surface. In general, the solutions set forth in copending application Serial No. 758,429, filed September 2, 1958, are suitable. A two minute treatment in an aqueous solution of three percent by weight of sodium hydroxide maintained at 50° C. has been found to produce satisfactory removal of the thermal oxide film.

After washing in cold water, the wire is cleaned using conventional cleaning solutions, such as a mixture of chromic and sulfuric acids.

Following the above cleaning step, the wire anode is boiled in distilled water for a prescribed period of time. The apparent effect of this boiling is the production of a hydrated oxide film on the surface of the aluminum anode. The beneficial effects attributable to the boiling procedure are all the more remarkable when it is realized that the teaching of the prior art indicated the avoidance of any oxide film on the surface of the aluminum prior to the anodizing step. In this respect the prior art procedure called for an etching step immediately preceding anodization to provide a surface as free from oxide as possible.

The wire is then anodized in the customary manner. For example, an electrolyte which may be used is an aqueous solution containing three percent by weight of boric acid and one-half percent by weight of sodium borate tetrahydrate ($Na_2B_4O_7 \cdot 10H_2O$). The maximum anodizing voltage is applied initially and is maintained for approximately 30 to 60 minutes.

The anodized body is then coated with a layer of manganese dioxide formed in situ by a pyrolysis step. The anode is immersed into an aqueous solution containing in excess of 50 percent by weight of manganous nitrate, and then heated in air to a temperature in the range of from 300° C. to 425° C. for periods ranging from 90 seconds to 150 seconds for the lower temperature and from 40 seconds to 80 seconds for the higher temperature. At temperatures appreciably below 300° C. the increased time required for the pyrolysis causes a deterioration of the aluminum oxide film. This deterioration is believed caused by the reaction of aluminum oxide with the decomposition products of the manganous nitrate. At temperatures substantially above 425° C. the difference in the thermal coefficients of expansion of aluminum and aluminum oxide produces cracks in the dielectric oxide film which result in degeneration of the electrical characteristics of the finished capacitor.

Following the pyrolysis, the anode is reanodized at low current densities of the order of $2/10$ to 1 milliampere per square centimeter. The reanodizing is continued until a voltage approximately 90 percent that of the anodizing voltage is attained.

A second coating of manganese dioxide is applied in the manner described above and the anode again anodized at low current densities.

The final steps in the fabrication of the capacitor consist of coating the manganese dioxide with an aqueous slurry of graphite, drying the graphite coating, and schooping a protective soft solder casing over the graphite.

Table I illustrates the effect of the above-described annealing step on the aging qualities of a solid electrolytic capacitor. The capacitors of Examples 1 through 5 were constructed in accordance with the general procedures outlined above, 100 volts having been used as the anodizing voltage in each instance.

Table I

|  | Annealing Temperature, ° C. | Initial | | After Aging at 45 Volts for 24 Hours | |
|---|---|---|---|---|---|
|  |  | Capacitance (microfarads) | Effective Series Resistance (ohms) | Capacitance (microfarads) | Effective Series Resistance (ohms) |
| Example 1 | (¹) | .1594 | 30.0 | .1383 | 38.0 |
| Example 2 | 200–250 | .1776 | 20.0 | .1769 | 21.1 |
| Example 3 | 300–350 | .1820 | 19.6 | .1810 | 21.0 |
| Example 4 | 400–450 | .1698 | 23.0 | .1663 | 21.8 |
| Example 5 | 500–550 | .1779 | 22.0 | .1738 | 23.9 |

¹ Not annealed.

It is noted that the capacitance of the device fabricated with an unannealed anode, that of Example 1, decreased approximately 13 percent upon aging. Aging also produces an undesirable increase in the effective series resistance of the device. In contrast, the capacitors of Examples 2 through 5 which utilized annealed anodes exhibited increased stability.

The effect of the boiling procedure of this invention is reflected in the data shown in Table II. Examples 6 through 11 represent capacitors fabricated in accordance with the general procedures described above, 100 volts having been used as the anodizing voltage in each instance.

Table II

|  | Boiling (minutes) | Capacitance (microfarads) | Effective Series Resistance (ohms) | D.C. Over-Voltage (volts) | Leakage at 35 Volts D.C. (microamps) |
|---|---|---|---|---|---|
| Example 6 | (¹) | .1363 | 70.6 | 76 | 28 |
| Example 7 | 3 | .1622 | 43.1 | 86 | 1.05 |
| Example 8 | 5 | .1611 | 27.4 | 95 | 1.55 |
| Example 9 | 15 | .1594 | 30.0 | 94 | .52 |
| Example 10 | 25 | .1471 | 45.6 | 89 | .80 |
| Example 11 | 35 | .1351 | 70.0 | 89 | 1.28 |

¹ No boiling.

As indicated by Table II, boiling has a beneficial effect on capacitance, effective series resistance, D.C. over-voltage, and leakage current. The D.C. over-voltage is the voltage at which the leakage current shows instability when the potential is increased gradually from zero to such value over a period of about 15 seconds. This over-voltage is an indication of the maximum voltage which the capacitor will sustain.

Comparing the characteristics of the capacitor of Example 8, boiled for 5 minutes, with those of Example 6, which was not boiled, illustrates the marked effect of the boiling procedure on the above-mentioned properties.

Increasing the boiling time above five minutes produces a slight decrease in capacitance which is believed to be attributed to the change in the dielectric properties of the oxide film formed during anodization. The effective series resistance also increases with such an increase in boiling time. However, the leakage current continues to decrease with increases in boiling time and reaches a minimum at a boiling time of approximately 15 minutes. On the other hand, boiling times below five minutes result in higher leakage currents, lower capacitances, and increased effective series resistances. Accordingly, it appears that a boiling time of from approximately 3 to 25 minutes is preferred.

If it is desired to increase the capacitance of the device by the customary technique of etching to increase the surface area, such etching should preferably precede the annealing step of the present invention. Since the etching proceeds more rapidly at the strained areas of the surface, the surface is roughened and the surface area is increased. Annealing tends to eliminate strains and stresses. Accordingly, a body which has been annealed exhibits a smaller increase in surface area upon etching.

One reagent suitable for such selective etching of aluminum bodies is an aqueous solution containing approximately 1/10 percent by weight of copper chloride dihydrate ($CuCl_2 \cdot H_2O$), approximately 20 percent by weight of ammonium chloride, and approximately 12 percent by weight of commercial grade concentrated hydrochloric acid. Following the etching, the anode is rinsed in concentrated nitric acid to remove any copper which may have plated out on the surface of the aluminum body.

The anode is then annealed in the manner described above.

After the annealing step, the thermal oxide is removed from the surface. It is preferable to employ a reagent which does not react with the underlying aluminum, since such reaction tends to produce a smooth surface and consequently decreases the surface area. Thus, a weak alkali solution, for example, an aqueous solution containing one-half percent sodium carbonate by weight, or an aqueous solution of chromic and phosphoric acids, is preferred for the removal of the thermal oxide.

If the etched anode is annealed in air the maximum temperature at which the annealing may be conducted is 550° C. This maximum is set by consideration of the quantity of thermal oxide which forms during the annealing step, since a thick coating is formed at temperatures substantially above 550° C. During the vigorous treatment required to remove this thick oxide film, the reagents tend to attack the underlying aluminum metal, thus tending to remove the irregularities produced in the prior etching step. Consequently, the advantage due to increased surface area gained by use of the etching step is lost.

Solid aluminum electrolytic capacitors, employing porous aluminum bodies as anodes, may also be fabricated in accordance with the present invention. Since such anodes are heated to relatively high temperatures during the sintering step in their fabrication, a separate annealing step is not required (see copending application Serial No. 758,429, filed September 2, 1958).

The balance of the procedure outlined above for the wire anodes is followed in the fabrication of the porous anode type of capacitor.

The beneficial effects of the boiling step of the present process indicated in Table II have been found to be obtained in the fabrication of solid electrolytic capacitors employing porous aluminum bodies as anodes.

The examples described above are intended merely as illustrative of the present invention. Variations and substitutions may be made by one skilled in the art without departing from the spirit and scope of the invention. For example, although the invention is described primarily in terms of boiling in distilled water, other reasonably pure water, such as deionized or demineralized water, may be substituted.

What is claimed is:

1. In the fabrication of an aluminum solid electrolytic capacitor in which the anode of said capacitor is coated with manganese dioxide formed in situ by pyrolysis at a temperature of at least 300° C., the steps of annealing the aluminum body destined for use as the said anode in the said capacitor for at least ten minutes at a temperature at least equal to the temperature employed in the pyrolysis step in which manganese dioxide is formed in situ.

2. In the method of fabricating an aluminum solid electrolytic capacitor comprising the steps of anodizing an aluminum body, coating said aluminum body with a layer of manganese dioxide formed in situ by a pyrolysis step at a temperature of at least 300° C., reanodizing said aluminum body, coating said manganese dioxide with an aqueous slurry of graphite and schooping a protective soft solder casing over the graphite, the improvement which comprises successively annealing said aluminum body for at least ten minutes at a temperature at least equal to the temperature employed in the pyrolysis in which manganese dioxide is formed in situ, and treating said body in boiling water prior to anodization.

References Cited in the file of this patent
UNITED STATES PATENTS

| | | |
|---|---|---|
| 1,811,298 | Boulanger | June 23, 1931 |
| 1,946,147 | Bengsten | Feb. 6, 1934 |
| 2,400,804 | Beneke | May 21, 1946 |
| 2,829,076 | Rue | Apr. 1, 1958 |
| 2,859,148 | Altenpohl | Nov. 4, 1958 |
| 2,868,702 | Brennan | Jan. 13, 1959 |

FOREIGN PATENTS

| | | |
|---|---|---|
| 173,742 | Great Britain | Apr. 9, 1923 |

OTHER REFERENCES

Metals Handbook, 1948 edition, pp. 776–777.

Steel: "Finishing Aluminum," Oct. 31, 1949 (pp. 53–56, 58 and 60). (Page 58 relied on.)

Goldowski: Abstract of application Serial Number 619,264, published Apr. 29, 1952; 657 O.G. 1582.